US011859139B2

(12) United States Patent
Kumar et al.

(10) Patent No.: US 11,859,139 B2
(45) Date of Patent: Jan. 2, 2024

(54) PROCESS FOR CRUDE PETROLEUM OIL PROCESSING IN THE CRUDE DISTILLATION UNIT (CDU)

(71) Applicant: COUNCIL OF SCIENTIFIC AND INDUSTRIAL RESEARCH AN INDIAN REGISTERED BODY INCORPORATED, New Delhi (IN)

(72) Inventors: Sunil Kumar, Uttarakhand (IN); Avinash Mhetre, Uttarakhand (IN); Ojasvi Sharma, Uttarakhand (IN); Manoj Srivastava, Uttarakhand (IN); Anjan Ray, Uttarakhand (IN)

(73) Assignee: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

( * ) Notice: Subject to any disclaimer, the term of this patent is extended or adjusted under 35 U.S.C. 154(b) by 46 days.

(21) Appl. No.: 17/816,953

(22) Filed: Aug. 2, 2022

(65) Prior Publication Data

US 2023/0045380 A1 Feb. 9, 2023

(30) Foreign Application Priority Data

Aug. 3, 2021 (IN) .............................. 202111035121

(51) Int. Cl.
  *C10G 53/02* (2006.01)
  *B01D 3/06* (2006.01)
  (Continued)

(52) U.S. Cl.
  CPC ............... *C10G 53/02* (2013.01); *B01D 3/06* (2013.01); *B01D 3/10* (2013.01); *B01D 3/143* (2013.01);
  (Continued)

(58) Field of Classification Search
  None
  See application file for complete search history.

(56) References Cited

U.S. PATENT DOCUMENTS

| 7,172,686 B1 | 2/2007 | Ji et al. |
| 9,546,324 B2 | 1/2017 | Kumar et al. |
| 2015/0122704 A1* | 5/2015 | Kumar ..................... C10G 7/00 208/361 |

OTHER PUBLICATIONS

Bagajewicz, Miguel, et al., "Rigorous Procedure for the Design of Conventional Atmospheric Crude Fractionation Units. Part I: Targeting", Ind. Eng. Chem. Res., 40 (2001), 617-626.

(Continued)

*Primary Examiner* — Tam M Nguyen
(74) *Attorney, Agent, or Firm* — Schwegman Lundberg & Woessner, P.A.

(57) ABSTRACT

Method for crude petroleum oil processing in Crude Distillation Unit is provided to eliminate the stripping steam in an Atmospheric Distillation Column (VDC) of CDU for a significant reduction in the CDU's operating cost and alleviating the corrosion in the overhead section of ADC. The present invention relates to a method of separating the components of crude petroleum oil. The proposed method utilizes the innovative application of process hydrocarbon vapour consisting of a lighter fraction of crude and natural gas. The conceptualized new schemes for downstream processing the Light and Heavy gas oil (LGO and HGO) distillates to meet their boiling specifications are also disclosed.

15 Claims, 5 Drawing Sheets

(51) Int. Cl.
*B01D 3/10* (2006.01)
*B01D 5/00* (2006.01)
*B01D 3/14* (2006.01)

(52) U.S. Cl.
CPC ..... *B01D 5/006* (2013.01); *C10G 2300/4006* (2013.01); *C10G 2400/06* (2013.01); *C10G 2400/08* (2013.01)

(56) References Cited

OTHER PUBLICATIONS

Errico, Massimiliano, et al., "Energy saving in a crude distillation unit by a preflash implementation", Applied Thermal Engineering, 29, (2009), 1642-1647.
Golden, S. W., "Prevent preflash drum foaming", Hydrocarbon Processing, 76, (May 1997), 141-153.
Ji, Shuncheng, et al., "Design of Crude Fractionation Units with Preflashing or Prefractionation: Energy Targeting", Ind. Eng. Chem. Res., 41, (2002), 3003-3011.

\* cited by examiner

PROCESS FOR CRUDE PETROLEUM OIL PROCESSING IN THE CRUDE DISTILLATION UNIT (CDU)

CLAIM OF PRIORITY

This application claims the benefit of priority to Indian Application No. 202111035121, filed 3 Aug. 2021, which application is incorporated by reference as if reproduced herein and made a part hereof in its entirety, and the benefit of priority of which is claimed herein.

FIELD OF THE INVENTION

The present invention relates to a method for crude petroleum oil processing in the Crude Distillation Unit (CDU). More particularly present invention relates to a novel crude petroleum oil processing scheme for CDU to eliminate the requirement of stripping steam in the Atmospheric Distillation Column (ADC) of CDU for a significant reduction in the operating cost and substantially ameliorates corrosion in the overhead section of the ADC.

BACKGROUND OF THE INVENTION

The CDU comes to be at the beginning of the refinery to fractionate the crude petroleum oil into the products of the desired boiling range. The various crude oil processing methods have been reported in the literature [SW Golden, Prevent preflash drum foaming, Hydrocarbon Process. 76 (1997), 141-153; Miguel Bagajewicz and Shuncheng Ji, Rigorous Procedure for the Design of Conventional Atmospheric Crude Fractionation Units. Part I: Targeting, Ind. Eng. Chem. Res. 2001, 40, 617-626; ShunchengJi and Miguel Bagajewicz, Design of Crude Fractionation Units with Preflashing or Prefractionation: Energy Targeting, Ind. Eng. Chem. Res. 2002, 41, 3003-3011; Shuncheng, Ji et al., Methods for increasing distillates yield in crude oil distillation, 2007, U.S. Pat. No. 7,172,686B1; Errico, M. et al., Energy saving in a crude distillation unit by a preflash implementation, Applied Thermal Engineering 29 (2009) 1642-1647; Kumar, S. et al., a method for increasing gas oil yield and energy efficiency in crude oil distillation. U.S. Pat. No. 9,546,324B2, 2017].

The Crude Petroleum Oil (CPO) is heated in Heat Exchanger Network (HEN) using the process hot streams prior to its feeding to desalter. Desalting of CPO is done with the help of water to dissolve soluble salt. The brine water containing salt is removed.

The desalted CPO is again preheated using the process hot streams in another HEN. The heated crude is processed either in Prefractionation Distillation Column (PDC) or in Flash Drum (FD) or directly routed to a fired furnace depending upon the CPO processing method selected in CDU design.

In the case of preheated crude processing in PDC, the Light Naphtha (LN) obtained from the top of PDC is directly routed to the naphtha stabilizing column. In the case of heated CPO routing to FD, the FD vapour is routed to the ADC or mixed with the liquid obtained from FD at some location in the heating tube or at the outlet of the fired furnace.

The application of multiple FDs is also disclosed in the literature. In one scenario, the vapour from the first FD is cooled in a cooler and routed to the second flash drum. The vapour from the second FD and liquid from the first FD are mixed and routed to the fired furnace. The liquid from the second FD is routed at the desired location to ADC or to the side stripper. The vapour from the second FD is further cooled and routed to the third FD in another combination. The vapour from the third FD and liquid from the first FD are mixed and processed in the fired furnace. The liquid from the second and third FDs are routed to ADC above the feed tray location.

One study has shown that the FD vapour is superheated and routed to the bottom of the ADC to improve the distillate yield of the ADC and decrease the energy requirement.

Depending upon the design configuration of CDU, the crude oil coming from desalter or crude oil from the bottom of the flash drum or crude oil from the bottom of the prefractionation column is partially vapourized in the fired furnace. The partially vapourized crude oil is fed to the flash zone of ADC to obtain the distillate products such as, not limited to, naphtha, kerosene, light gas oil (LGO) and Heavy Gas Oil (HGO) in the upper section of ADC and Reduced Crude Oil (RCO) from the ADC's bottom. The heat at different temperature level is recovered using pump-arounds at different locations in ADC and overhead condenser. In the pump-around circuit, the liquid stream is withdrawn, cooled with process streams and sent back to ADC. The distillate products drawn from different locations in ADC are further processed in their respective side strippers to remove the dissolved lighter components to meet the product's ASTM D86-5 vol % distillation specifications. The stripping steam at ADC bottom is used to recover the dissolved distillate with Long Residue (LR). LR is further heated in a fired furnace before entering the flash zone of the Vacuum Distillation Column (VDC). The distillate products like vacuum diesel, Light Vacuum Gas Oil (LVGO), Heavy Vacuum Gas Oil (HVGO) are obtained from the upper section of the VDC and vacuum residue as the bottom product.

In another reported prior art, the LR is routed to an FD to separate its lighter fraction as vapour. This vapour is routed to the VDC bottom as a stripping media.

OBJECTIVES OF THE INVENTION

Accordingly, the primary objective of the present invention is to disclose a method for crude petroleum oil processing in a crude distillation unit to eliminate stripping steam's requirement in the Atmospheric Distillation Column (ADC) of CDU for a significant reduction in the CDU's operating cost and substantially ameliorates corrosion in the overhead section of the ADC.

Another objective of the present invention is to reduce the water content in overhead vapour, leading to lower vapour's water dew point and positive difference between reflux temperature and ADC's vapour water dew point.

One more objective of the present invention is to disclose a method for fractionating crude petroleum oil into products of desired boiling range and quality.

Yet another objective of the present invention is to reduce the operating pressure of ADC to facilitate the easier separation without increasing the intensity of the corrosive environment in the ADC's overhead section.

Yet another objective of the present invention is to reduce the furnace's Coil Outlet Temperature (COT) by reducing ADC's operating pressure to reduce the craking tendency of crude oil in the furnace and ADC's bottom section without compromising the distillates yield and their quality.

Yet another objective of the present invention is to provide a new processing scheme to remove the dissolved light hydrocarbons of Light and Heavy Gas Oil (LGO and HGO) distillates obtained from ADC.

SUMMARY OF THE INVENTION

Accordingly, the present invention provides a method for crude petroleum oil processing in Crude Distillation Unit (CDU) to overcome the disadvantages of existing crude petroleum oil processing methods and to meet the objectives of the present invention wherein the said process comprising the steps of;
a) subjecting the crude petroleum oil (1) to desalter (2) along with water in the temperature range of 110-140° C. to remove the water-soluble salts;
b) heating the desalted crude oil in Heat Exchanger Network (HEN2) and routing the partially vaporized crude oil (3) to two phases separating vessel (4) along with the hydrocarbon vapour (24) consisting of a lighter fraction of crude and natural gas stream (25);
c) superheating hydrocarbon vapour (7) from the vessel (4) to form superheated hydrocarbon vapour (7B) using the hot process steam and external heating sources;
d) heating the liquid crude oil stream (5) obtained from the vessel (4) in the Heat Exchanger Network (HEN3) in the temperature range of 270-330° C. and fed to a fired furnace (F1) for its heating in the temperature range of 360-390° C.;
e) Injecting the superheated hydrocarbon vapour (7B) to the stripping section (10) and routing of partially vaporized crude oil (6) to flash zone (9) of atmospheric distillation column (8) having the plurality of trays to generate the different distillates, overhead vapour (15) and long residue stream (18);
f) cooling the overhead vapour (15) using condenser (E-1) and fed to vessel (V1) to separate vapour (16) and liquid (reflux) which is routed to atmospheric distillation column (8);
g) routing the vapour (16) and water stream (16A) to cooler (E-2) for cooling in the temperature range of 35-50° C. and feeding stream (16B) to vessel (V2) to separate unstabilized naphtha (17) and vapour stream (20);
h) compressing the vapour stream (20) using compressor (CP-1) and cooling the compressed vapour in the temperature range of 35-50° C. using cooler (E-3);
i) subjecting the cooled stream (20A) to vessel (V3) to separate the liquid as stream (22) and noncondensed vapour as stream (21);
j) subjecting the unstabilized naphtha (17) from step (g) and liquid stream (22) from step (i) to distillation column (15) to produce the LPG product, Light Naphtha (LN) product and vapour stream (23);
k) mixing vapour stream (21) from step (i) and vapour stream (23) from step (j) to form the stream (24), which is subjected to a vessel (4) in step (b) after withdrawing a purge stream from the stream (24);
l) passing the heavy naphtha and kerosene distillates from the different tray of distillation column (8) to the side strippers (11 and 12) respectively to remove lighter hydrocarbon and to obtain heavy naphtha (HN) and kerosene products;
m) routing the Light and Heavy Gas Oil (LGO and HGO) distillates obtained from the different tray of distillation column (8) to vessel (13A) and vessel (14A) respectively through their respective pressure-reducing valves (FIG. 2.) or routing the LGO and HGO distillates to heaters E-6 and E-7 respectively prior to their routing to vessel (13A) and vessel (14A) (FIG. 3) or routing the LGO and HGO distillates to respective reboiled strippers (13B) and reboiled strippers (14B) (FIG. 4) to remove dissolved lighter hydrocarbon;
n) condensing the vapour (26) from the vessel (13A) and vapour (27) from the vessel (14A) using coolers (E4) and (E5) respectively and routing of respective condensate to atmospheric distillation column (8) using pumps (not shown in the FIGS. 2&3); and
o) heating the long residue stream (18) along with coil steam in a furnace (F3) and processing the partially vaporized crude (19) in a Vacuum Distillation Column (VDC) to obtain the vaccum distillates and residue products.

Still, in another embodiment of the present invention, the vapour stream (20) from vessel (V2) is compressed in the pressure range of 6-12 kg/cm$^2$ using the compressor (CP-1). The compressed vapor is cooled in cooler (E-3) in the temperature range of 35-50° C. The cooled stream (20A) is routed to bottom tray of absorption tower (ABS) having plural trays. One part (stream, 17A) of unstabilized naphtha stream (17) is routed to top tray of ABS. The liquid stream (22) from ABS and remaining part (stream, 17B) of unstabilized naphtha stream (17) are routed to the distillation column (15) to produce the LPG and Light Naphtha LN product and noncondensate vapour stream (23).

In an embodiment of the present invention, steam (26) is injected at the bottom of ADC (8) in superheated hydrocarbon vapour (7B) to Steam (26) ratio in the range of 0.01-0.2.

Still, in another embodiment of the present invention, the desalted crude oil from step (b) is heated in a Heat Exchanger Network (HEN 2), preferably in the temperature range of 160-250° C. and most preferably in the temperature range of 170-220° C.

In an embodiment of the present invention, the hydrocarbon vapour (7) from step (c) is superheated preferably in the temperature range of 300-380° C. and most preferably in the temperature range of 330-370° C. using HEN4 or high-pressure steam heater (HPX) or furnace (F2) or separate vapour heating coils along with the crude oil coils in the furnace (F1) or their combination.

Still, in another embodiment of the present invention, overhead vapour (15) from step (f) is cooled using a condenser (E-1) preferably in the temperature range of 70-130° C. and most preferably in the temperature range of 80-120° C.

In an embodiment of the present invention, vapour stream (20) from step (h) is compressed using a compressor (CP-1), preferably in the pressure range of 7-15 kg/cm2 and most preferably in the pressure range of 8-12 kg/cm.$^2$ In another embodiment of the present invention, Light Gas Oil (LGO) distillate and LGO and HGO distillates obtained from ADC (8) are heated in heat exchangers E-6 and E-7, respectively, using either hot products and pump-arounds streams or the liquid stream (28) collected from the adjacent upper tray to flash zone (9) of ADC (8) or a stream (29) drawn from the long residue (18) prior to their routing to vessels (13 and 14).

In another embodiment of the present invention, the liquid stream (28) collected from the adjacent upper tray to flash zone (9) of ADC (8) or a stream (29) drawn from the long residue (18) is used as a hot process stream to meet the very high-temperature requirement in HGO stripper's reboiler (E-8).

In another embodiment of the present invention, the liquid stream (28) collected from the adjacent upper tray to flash zone (9) of ADC (8) or a stream (29) withdrawn from long residue stream (18) or other hot stream is used in LGO stripper reboiler.

In one embodiment of the present invention, the hydrocarbon vapour stream (24) is heated in the temperature range of 100-200° C. using the process hot stream prior to their feeding to two phases separating vessel (4).

Still, in another embodiment of the present invention, the heat of the ADC (8) is removed by pump-arounds (Kero-PA, LGO-PA, and HGO-PA) and condenser (E-1).

DETAILED DESCRIPTION OF THE INVENTION

The present invention relates a method for crude petroleum oil processing in a CDU to overcome the disadvantages of prior art processes. In order to describe the current invention, figures drawn in accordance with the existing design and preferred embodiments of the current invention are prepared. The same numeral is used in drawings to refer to the same or similar or stream or column elements. It is important to note that invention is not limited to the precise arrangements of apparatus shown in drawings. The reference to FIGS. 1, 2,3, 4, and 5 are made to describe the present invention in detail.

Figure 1:
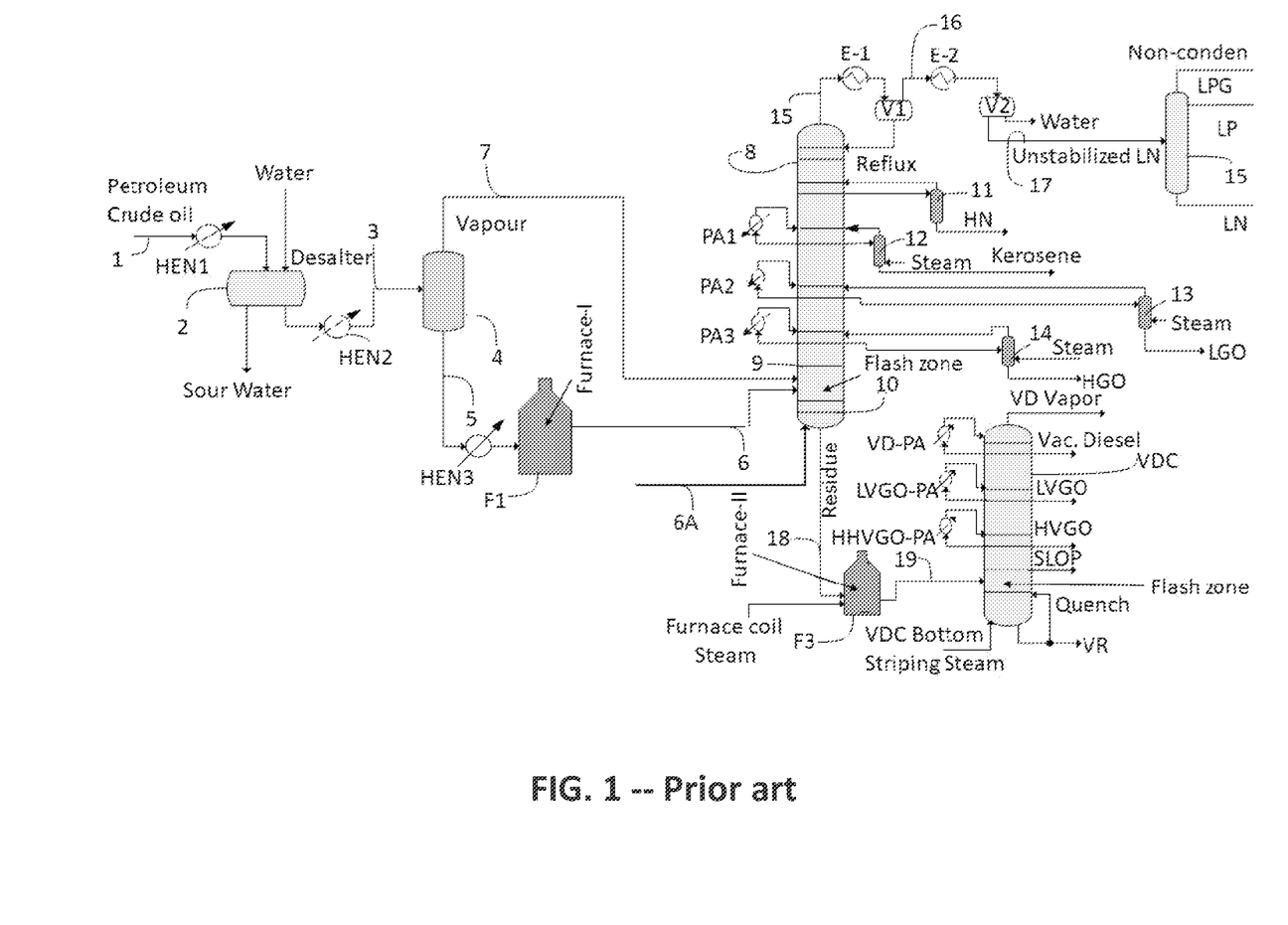
FIG. 1 is a systematic representation of a method conceptualized in accordance with prior art to construct a comparative example for establishing the basis for demonstrating the benefits of the present invention over the closest prior art for crude petroleum oil processing in CDU.

Referring to FIG. 1, representing the method of prior art, conceptualized to construct a comparative example for establishing the basis for demonstrating the benefits of the present invention over the closest prior art for crude petroleum oil processing in CDU. Crude petroleum oil (1) is heated in a HEN1 in the temperature range of 110-140° C. and fed to desalter (2), where it comes in contact with water to remove the water-soluble salt. Desalted Crude Oil (DCO) obtained from desalter is further heated in a HEN2 in the temperature range of 160-230° C. using hot process streams. The partially vaporized crude oil (3) is fed to the vessel (4). The hydrocarbon vapour (7) from the vessel (4) is fed to flash zone (9) of the atmospheric distillation column (8). The liquid stream (5) from the vessel (4) is heated in the temperature range of 270-330° C. using a HEN3 and further heated in a fired furnace (F1) in the temperature range of 360-390° C. The partially vaporized crude (6) is also fed to flash zone (9) of the atmospheric distillation column (8). Thus crude oil is separated into distillate products and long residue (18) in the Vacuum Distillation Column (VDC).

The overhead vapour (15) is fed to vessel (V1) after its cooling in the condenser (E-1) in the temperature range of 85-125° C. The liquid from V1 is used as reflux to ADC (8). The vapour stream (16) from V1 is fed to the vessel (V2) after its cooling in a cooler (E-2) in the temperature range of 35-50° C. The unstabilized naphtha stream (17) from V2 is routed to the distillation column (15) to produce the LPG and Light Naphtha (LN) product and noncondensed vapour stream (23).

The heavy naphtha, kerosene, Light Gas Oil (LGO) distillate and Heavy Gas Oil (HGO) distillates from the different tray of distillation column (8) are routed to the side strippers 11,12,13 and 14, respectively, to remove the lighter hydrocarbon for meeting the specifications of the final product. The heat of distillation column (8) having plural trays is removed by one or more pump-arounds (PA1, PA2 and PA3) and condenser (E-1).

The LR (18) from distillation column (8) along with furnace coil steam is heated in a furnace (F3) in the temperature range of 390-430° C. The partially vaporized long residue (19) is routed to the VDC for obtaining the distillate products (VD vapour, vacuum diesel, Light Vacuum Gas Oil-LVGO, Heavy Vacuum Gas Oil-HVGO) and Vacuum Residue (VR). VDC has plural trays and stripping steam at the bottom tray, equipped with pump-arounds for heat removal and vacuum generating device like ejector or vacuum pump (not shown in the figure)

Figure 2:
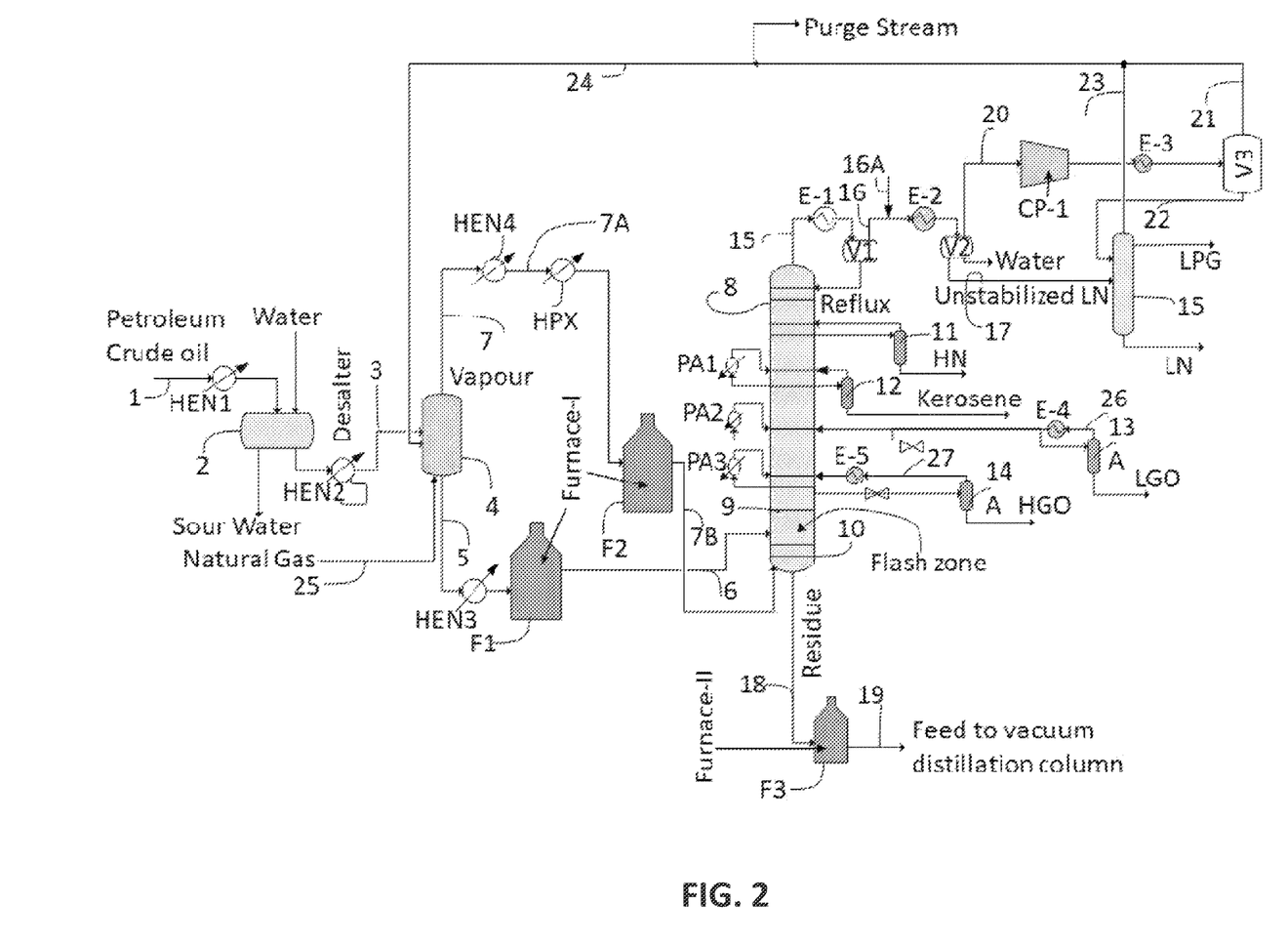
FIG. 2 is a systematic representation of a method constructed in accordance with one of the embodiments of the present invention for crude petroleum oil processing in a CDU to demonstrate the applicability and benefits of the present invention.

Referring to FIG. 2, representing the method constructed in accordance with one of the embodiments of the present invention for crude petroleum oil processing in CDU to demonstrate the applicability and benefits of the present invention. This method has the same configuration and operation, as shown in FIG. 1 for generating the stream (3). The partially vaporized crude oil (3) along with hydrocarbon vapour (24) comprising of a lighter fraction of crude and natural gas stream (25) are fed to the two phases separating vessel (4), having plural trays. The hydrocarbon vapour (7) from the vessel (4) is further superheated in the temperature range of 300-370° C. using the combination of HEN4, and high-pressure steam heater (HPX), or furnace (F2) or separate vapour coils along with crude oil coils in the furnace (F1). The superheated vapour (7A) is injected into either the bottom tray of the stripping section (10) or a tray between the bottom tray and flash zone (9) of the atmospheric distillation column (8). The liquid stream (5) is heated in the temperature range of 270-330° C. by using a heat exchanger network (HEN3) and in the temperature range of 360-390° C. by the fired furnace (F1). The partially vaporized crude (6) is also fed to flash zone (9) of the atmospheric distillation column (8). Thus crude oil is separated into distillate products and long residue (18) in the ADC.

The overhead vapour (15) is fed to vessel (V1) after its cooling in the condenser (E-1) in the temperature range of 85-125° C. The liquid from V1 is used as reflux to ADC (8). The vapour stream (16) from V1 and a water stream (16A) are mixed and fed to the vessel (V2) after cooling in a cooler (E-2) in the temperature range of 35-50° C. The vapour stream (20) from V2 is compressed in the pressure range of 8-14 kg/cm$_2$ using the compressor (CP-1). Compressed stream is cooled in cooler (E-3) in the temperature range of 35-50° C. The cooled stream (20A) is routed to flash vessel (V3). The liquid stream (22) from V3 and unstabilization naphtha stream (17) from V2 are routed to the distillation column (15) to produce the LPG and Light Naphtha LN product and noncondensate vapour stream (23). The vapour stream (21) from V3 and vapour stream (23) from distillation column (15) are mixed, and mixed stream (24) is routed to separating vessel (4) to generate the hydrocarbon vapour (7).

The heavy naphtha and kerosene distillates from the different tray of ADC (8) are routed to the side strippers (11) and (12), respectively, to remove the lighter hydrocarbon for meeting the specifications of the final product. The LGO and HGO distillates are routed to the vessel (13A) and vessel (14A) through their respective valves. The vapour streams 26 and 27 from the vessel (13A) and vessel (14A) are condensed in cooler (E-4) and cooler (E-5), respectively, to generate condensed liquids that are returned back to the distillation column (8) using pumps (not shown in figure). The heat of distillation column (8) having plural trays is removed by one or more pump-arounds (Kero-PA, LGO-PA and HGO-PA). The downstream processing of the long residue stream (18) is the same as shown in FIG. 1.

Figure 3:
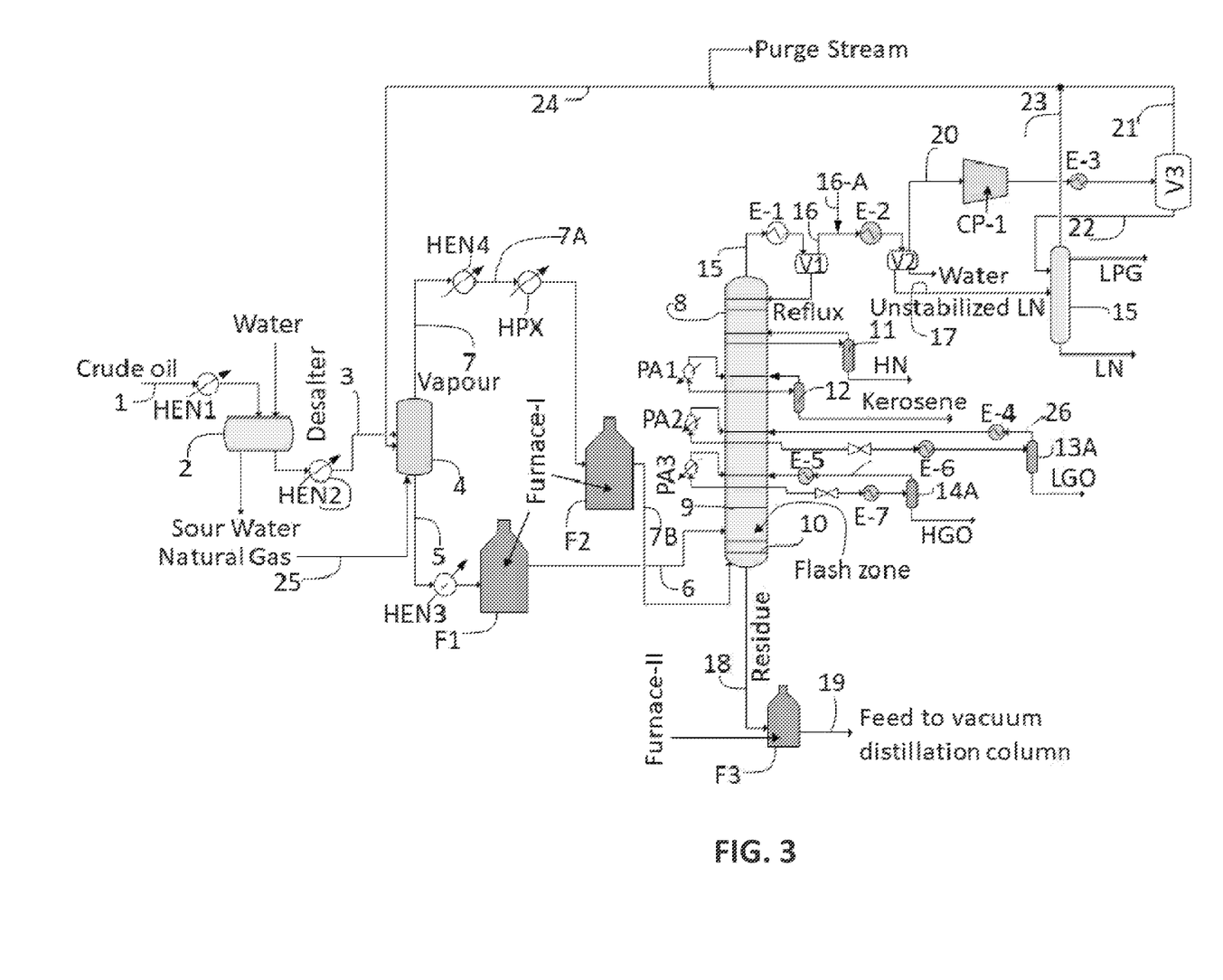
FIG. 3 is a systematic representation of another variation of a method, described in FIG. 2, constructed in accordance with one of the embodiments of the present invention for crude petroleum oil processing in a CDU for demonstrating another processing scheme of HGO distillate obtained from ADC.

Referring to FIG. 3, representing another variation of a method as described in FIG. 2, constructed in accordance with one of the embodiments of the present invention for crude petroleum oil processing in CDU. This method has the same configuration and operation, as shown in FIG. 2, except that Light Gas Oil (LGO) and HGO distillates are heated in heat exchangers E-6 and E-7, respectively, using either hot product and pump-around streams or the liquid stream (28) collected from the adjacent upper tray to flash zone (9) of ADC (8) or a stream (29) drawn from the long residue (18) before their routing to respective vessels 13A and 14A.

Figure 4:
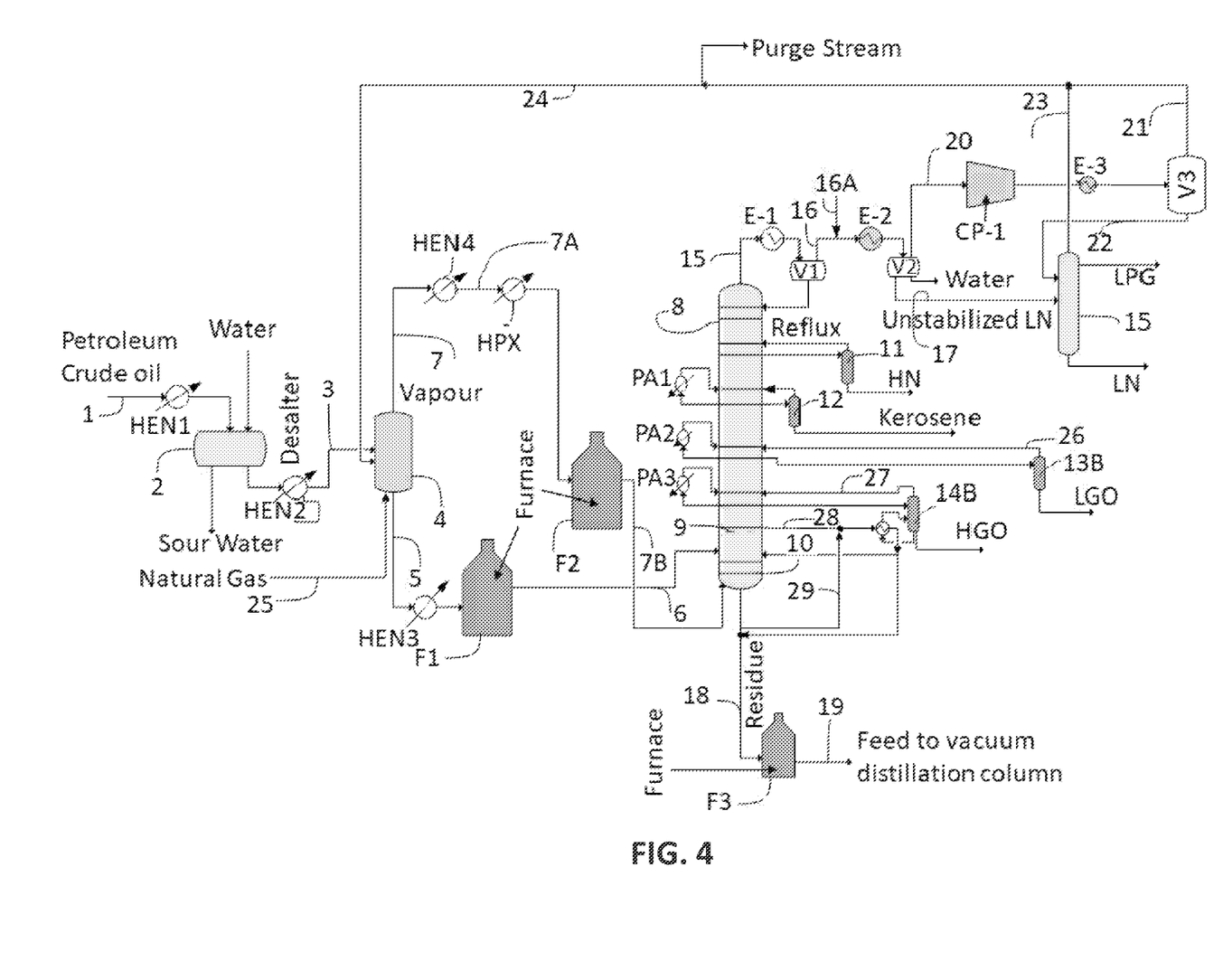
FIG. 4 is a systematic representation of another variation of a method, described in FIG. 2, constructed in accordance with one of the embodiments of the present invention for crude petroleum oil processing in CDU for demonstrating another processing scheme of LGO and HGO distillates obtained from ADC.

Referring to FIG. 4, representing another variation of a method as described in FIG. 2, constructed in accordance with one of the embodiments of the present invention for crude petroleum oil processing in CDU to demonstrate new heating supplying mechanism in HGO reboiler stripper to meet the very high-temperature requirement. This method has the same configuration and operation, as shown in FIG. 2, except that LGO distillate is routed to a reboiled side stripper (13B), which reboiler can use either hot product or hot pump around streams or HP steam, the liquid stream (28) collected from the adjacent upper tray to flash zone (9) of ADC (8) or a stream (29) drawn from the long residue (24) for supplying heating energy. The reboiled side stripper (13B) vapor (26) is routed to ADC without any cooling and pumping. HGO distillate is routed to reboiled side stripper (14B), which reboiler (E-8) uses either the liquid stream (27) collected from the adjacent upper tray to flash zone (9) of ADC (8) or a stream (29) drawn from the long residue (18) for supplying the heating energy at high temperature. The reboiled side stripper (14B) vapor (27) is routed to ADC without any cooling and pumping.

Figure 5:
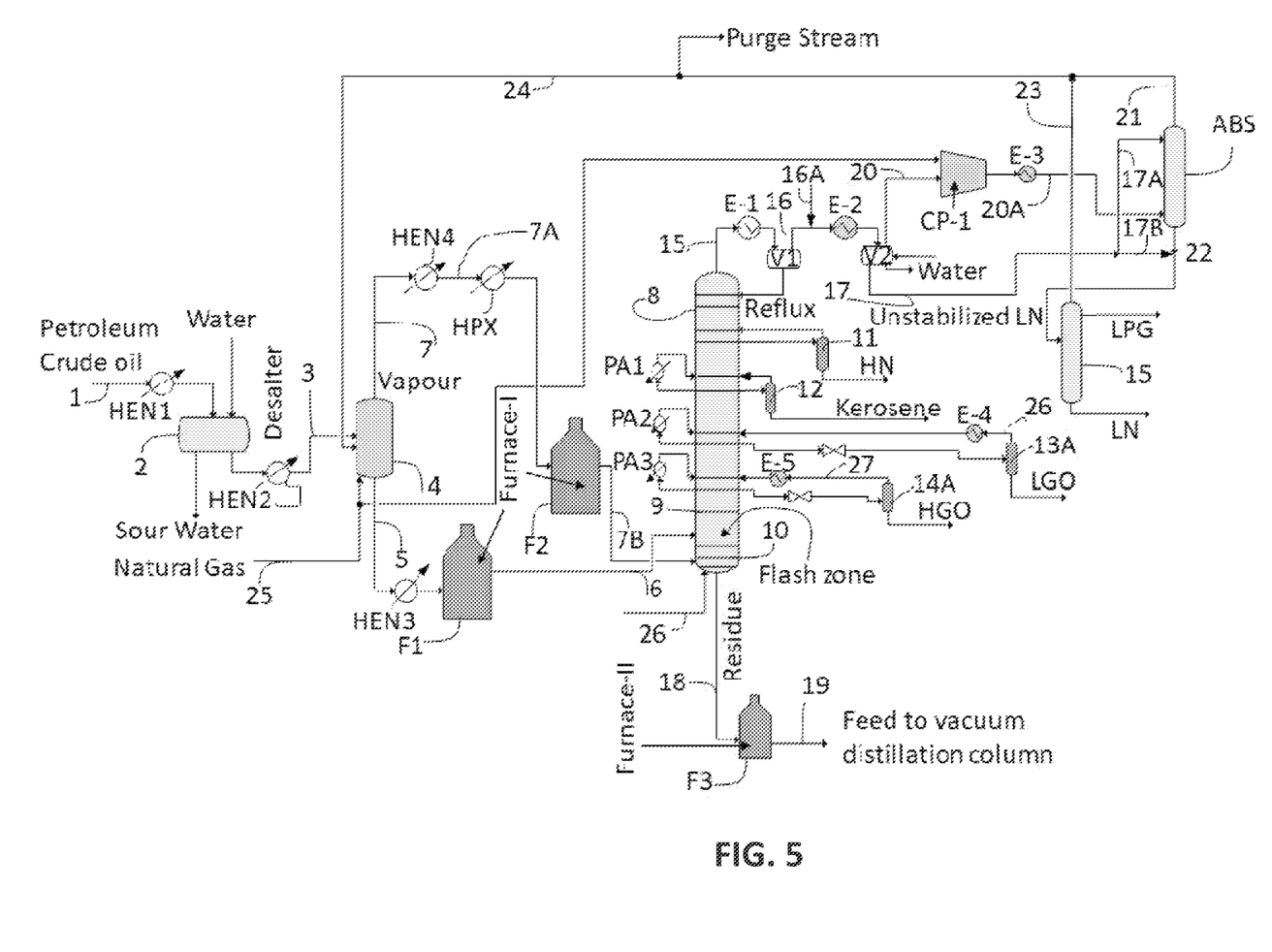
FIG. 5 is a systematic representation of another variation of a method, described in FIG. 2, constructed in accordance with one of the embodiments of the present invention for crude petroleum oil processing in CDU.

Referring to FIG. 5, representing another variation of a method as described in FIG. 2, constructed in accordance with one of the embodiments of the present invention for crude petroleum oil processing in CDU. This method has the same configuration, operation and long residue processing, as shown in FIG. 2, except that the vapour stream (20) from vessel (V2) is compressed in the pressure range of 6-12 kg/cm$^2$ using the compressor (CP-1). The compressed vapor is cooled in cooler (E-3) in the temperature range of 35-50° C. The cooled stream (20A) is routed to bottom tray of absorption tower (ABS) having plural trays. One part (stream, 17A) of unstabilized naphtha stream (17) is routed to top tray of ABS. The liquid stream (22) from ABS and remaing part (stream, 17B) of unstabilized naphtha stream (17) are routed to the distillation column (15) to produce the LPG and Light Naphtha LN product and noncondensate vapour stream (23). Steam (26) is injection at the bottom tray of ADC (8) to reduce the lighter vapor carryover with long residue stream (18) and VDC top vapor load to vacuum generating device.

The present invention relates to a method for crude petroleum oil processing in the crude distillation unit, which is the starting point of the refining process of crude oil in a petroleum refinery. More particularly, the present invention relates to a novel crude petroleum oil processing scheme for CDU to eliminate the requirement of stripping steam in the Atmospheric Distillation Column (ADC) of CDU. This invention leads to a significant reduction in the operating cost and substantially ameliorates corrosion in the overhead section of the ADC.

It is well known to one skilled in the art that the CDU has the highest throughput among all units in the refinery. The conventional processing of crude petroleum oil in CDU consumes enormous energy and stripping steam. A person skilled in the art knows that the quantitative requirement of energy and stripping steam for crude oil processing depends on the CDU design configuration, which, in turn, depends on the method used of crude petroleum oil processing in CDU. The person skilled in the art of crude distillation also understands that steam cost is much higher than fuel cost for the same thermal energy content in the refinery, since steam is produced by fuel with consequent energy efficiency losses in generation and use of steam.

Moreover, there are corrosion and fouling issues in the Top Section and Overhead System (TSOVS) of ADC. The severities of these issues are typically higher for heavy and sour (Sulfur-rich) crude oils (referred to in the trade as "opportunity crudes") and for crude oils that are difficult to desalt. However, the processing of such challenging crudes in CDU continues to increase due to their easier availability and lower cost.

The primary sources for a corrosive environment in the TSOVS of ADC are aqueous corrosion due to Hydrogen Chloride (HCl), Hydrogen Chloride (HCl) and deposit corrosion due to ammonium and/or hydrochloride salts. The corrosion and fouling issues inside the ADC are caused by low-temperature reflux in conjunction with Hydrochloric Acid (HCl), ammonia ($NH_3$) and amines present in the vapour. Cold reflux and cold reflux shocks cause localized water condensation inside the column. The first water droplets formed by localized condensation can be very acidic (very low pH) and can induce severe localized corrosion. Further, the dissolved HCl, $NH_3$ and amine in condensed water will lead to $NH_4Cl$ salts deposition as the water carrying these molecules vaporizes. These deposited salts remain dry and non-corrosive as long as the process temperature is sufficiently above the vapour's water dew point temperature. Thus, a positive temperature gap between the vapour's water dew point and reflux temperature (i.e. excess of reflux temperature relative to the vapour's water dew point) can help to mitigate corrosion and fouling issues in the TSOVS of ADC.

In the existing methods for crude oil processing in CDU, high-pressure ADC operation is widely practiced in the industry. This facilitates the application of overhead systems consisting of two drums to provide the hot reflux to ADC to reduce the localized condensation, as compared to the alternative of a single drum overhead system that involves subcooled reflux to ADC. However, the temperature gap between vapour's water dew point and reflux temperature in the top section and overhead system of ADC tends to be negative even for two-drums based systems. This negative temperature gap can cause localized water condensation and thus lead to corrosion and fouling. Thus, there is always emphasis on developing new methods for crude petroleum oil processing in CDU, which can overcome the challenges of TSOVS temperature profiles in existing CDU designs.

The novelty of the present invention resides in generating the lighter hydrocarbon vapour in the process, and its utilization as stripping media at ADC bottom and developing a new kind of processing scheme for processing the LGO and HGO distillates obtained from ADC to provide the stripping steam free ADC operation. The proposed method leads to a significant reduction in operating cost, GHG emissions and alleviates the severity of the corrosive environment compared to existing crude processing methods for crude petroleum oil processing in CDU.

Further, the proposed method in the present invention increases the temperature gap between vapour's water dew point and operating temperature in the top section and overhead system of ADC without significant energy penalty or product quality loss. Thus, it avoids localized water condensation and alleviates the severity of the corrosive environment compared to existing crude processing methods for CDU.

The temperature gap between vapour's water dew point and operating temperature inside the top section temperature of ADC in the existing stripping steam-based processing methods is increased by increasing the column pressure due to the use of the hot reflux. However, it would be apparent to one skilled in the art that such increases in the column pressure lead to lower relative volatility, higher fired furnace coil outlet temperature for specific crude vaporization and enhanced cracking tendency of crude oil in the system.

In the present invention, the design temperature gap between reflux temperature and the vapour's water dew point temperature is significantly higher than that of existing crude oil processing methods. The present invention thus enables effective reduction of the ADC's pressure using a novel processing method, which can lead to a decrease in the Coil Outlet Temperature (COT) of the fired furnace to minimize the cracking tendency of crude oil in the fired furnace and ADC bottom section without compromising on the distillates yields and their quality.

It can be understood by a person skilled in the art that the process of the present invention can increase the yield of atmospheric distillate without increasing the bottom stripping steam, i.e. without increasing the corrosion severity in the overhead system of ADC and without increasing the furnace coil outlet temperature, at the same time without increasing the cracking tendency of crude oil in the system.

EXAMPLES

The following three examples are given by way of illustration to substantiate the invention and, therefore, should not be construed to limit the scope of the invention. The properties of Iranian heavy crude used in these examples are given in Table 1.

TABLE 1

Iranian heavy Crude properties.

| Crude | Initial temperature (° C.) | Final temperature (° C.) | Cut Yield By Vol (%) | Std Liquid Density (kg/m$^3$) |
|---|---|---|---|---|
| Whole Crude | IBP | FBP | 100.0 | 911.9 |
| Cut1 | IBP | 40 | 4.1 | 568.8 |
| Cut2 | 40.0 | 90.6 | 6.1 | 693.9 |
| Cut3 | 90.6 | 141.2 | 9.5 | 738.0 |
| Cut4 | 141.2 | 191.8 | 9.3 | 773.6 |
| Cut5 | 191.8 | 242.4 | 7.8 | 813.2 |
| Cut6 | 242.4 | 292.9 | 8.0 | 853.3 |
| Cut7 | 292.9 | 343.5 | 8.2 | 891.8 |
| Cut8 | 343.5 | 394.1 | 8.0 | 930.8 |
| Cut9 | 394.1 | 444.7 | 7.5 | 969.7 |
| Cut10 | 444.7 | 495.3 | 6.8 | 1011.7 |
| Cut11 | 495.3 | 545.9 | 5.9 | 1051.5 |
| Cut12 | 545.9 | 596.5 | 5.0 | 1090.2 |
| Cut13 | 596.5 | 647.1 | 4.0 | 1131.3 |
| Cut14 | 647.1 | 697.6 | 3.1 | 1170.2 |
| Cut15 | 697.6 | 748.2 | 2.3 | 1209.2 |
| Cut16 | 748.2 | 798.8 | 1.6 | 1248.3 |
| Cut17 | 798.8 | 849.4 | 1.1 | 1287.3 |
| Cut18 | 849.4 | 900.0 | 0.7 | 1326.4 |
| Cut19 | 900.0 | 950.0 | 1.1 | 1359.1 |
| Cut20 | 950.0 | FBP | 0.0 | 1395.5 |

Example 1 represents the base case (BC). This example is exemplary and constructed for establishing the basis to compare the quantitative advantages of the present invention.

Example 2 represents the Proposed Case-1(PC-1). This example illustrates the validation of the proposed crude petroleum oil processing method in CDU to reduce the operating cost and increase the gap between vapour's water dew point and operating temperature.

Example 3 represents the Proposed Case-2 (PC-2). This example illustrates the scope for reducing ADC overhead pressure and the fired furnace coil outlet temperature without compromising the quantity and quality of distillate products and still having a significant positive gap between vapour's water dew point and operating temperature to avoid corrosion in the overhead system of ADC.

Example 1: The flow scheme shown in FIG. 1 is used for this example. The 1163.2 tonnes/hr crude containing 3.2 tonnes of water is heated to a temperature of 185° C. using Heat Exchanger Networks (HEN1 and HEN2) and routed to a two-phase separating vessel (4) operating at 5 kg/cm$^2$ pressure to separate the vapour and liquid fractions. The liquid from the vessel (4) is preheated to a temperature of 385° C. using the (HEN4) and a fired furnace (F1). The partially vaporized liquid stream (6) and vapour stream (7) from the vessel (4) are routed to the flash zone (6th tray from bottom) of the ADC containing 58 trays and equipped with condensers, decanters and side strippers. The ADC was operated at top tray pressure of 3.7 kg/cm$^2$a with condenser-E-1's pressure drop of 0.5 kg/cm$^2$, condenser-E-2's pressure drop of 0.25 kg/cm$^2$ and column's pressure drop of 0.5 kg/cm.$^2$ The vapour from the flash zone is fractionated into distillates vis-à-vis unstabilized Light Naphtha (LN), Heavy Naphtha (HN), kerosene, Light Gas Oil (LGO), and Heavy Gas Oil (HGO). Liquid falling from the flash zone is stripped out using the stripping steam (6A) at the bottom tray of ADC (8). The HN distillate is routed to a reboiled-side stripper (11), and Kerosene, LGO and HGO distillates are routed to their respective steam stripped side strippers 12,13 and 14 to remove the dissolved lighter fraction to meet the products ASTM D-86 distillation five volume percent point temperature. The stripping steam of 16.5 tonnes/hr is used at ADC's bottom. The kerosene, LGO and HGO pump arounds were used to remove the heat at different temperature level from the column. The unstabilized light naphtha (17) is processed in a distillation column (15) having 20 trays and 10 kg/cm$^2$ operating pressure to obtain the LPG and Light Naphtha (LN) products.

The long residue (18) along with 5.0 tonne/hr furnace coil steam is heated in a fired furnace (F3) to the temperature value of 425° C. The partially vaporized crude (19) is processed in a Vacuum Distillation Column (VDC). VDC has 16 theoretical trays, top's pressure: 2.66 KPa, and bottom's pressure: 6.00 KPa. VDC produces the distillate products vis-á-vis vacuum diesel, Light Vacuum Gas Oil (LVGO), Heavy Vacuum Gas Oil (HVGO). The vacuum diesel, LVGO, HVGO products were withdrawn from the 15$^{th}$ 9$^{th}$ and 6$^{th}$ trays of VDC, having tray numbering from bottom to top. The 6.5 tonnes/hr stripping steam is used at the bottom of VDC.

The details of pump-arounds and side strippers for ADC and pump-arounds for VDC are given in Table 2.

TABLE 2

Details of pump-arounds and side strippers used

| Pump Around | Draw tray | Return tray | Flow [tonne/h] | Temperature drop, ° C. |
|---|---|---|---|---|
| ADC's Pump Around (PA.) | | | | |
| Kerosene-PA | 38 | 40 | 630.01 | 50.00 |
| LGO-PA | 24 | 26 | 580.01 | 70.00 |
| HGO-PA | 15 | 17 | 370.00 | 60.00 |
| VDC's Pump-around (PA) | | | | |
| TOPPA | 15 | 16 | 342.0 | 58.0 |
| LVGOPA | 9 | 10 | 461.0 | 65.4 |
| HVGOPA | 6 | 7 | 817.0 | 53.0 |

| Strippers | No of trays/ Efficiency | Liquid Draw tray | Vapour Return tray | Stripping steam, Tonne/hr/reboiler duty (Mkcal/hr) |
|---|---|---|---|---|
| ADC's Strippers | | | | |
| HN reboiled Stripper | 6/0.5 | 48 | 50 | 0.27 |
| Kerosene steam Stripper | 6/0.3 | 38 | 40 | 5.41 |
| LGO steam Stripper | 6/0.3 | 24 | 26 | 2.42 |
| HGO steam Stripper | 6/0.3 | 15 | 17 | 1.20 |

The flow rate of different products produced from ADC and VDC, for example-1, are given in Table 3.0.

TABLE 3.0

The flow rate of products produced from ADC and VDC

| Products | Product Flow rate, TPH | Products | Product Flow rate, TPH |
|---|---|---|---|
| Non-condensate | 0.704 | VDC Top Vap | 2.43 |
| LPG | 16.00 | Vacuum Diesel (VD.) | 50.68 |
| Light Naphtha (LN) | 110.58 | Light Vacuum Gas Oil (LVGO) | 146.24 |
| Heavy Naphtha (HN) | 12.75 | | |
| Kerosene | 194.62 | Heavy Vacuum Gas Oil (HVGO) | 154.72 |
| Light Gas Oil (LGO) | 112.27 | | |
| Heavy Gas Oil (HGO) | 64.99 | Vacuum Slop Product | 15.00 |
| Long Residue (LR) | 648.69 | Vacuum Residue (VR) | 279.05 |

Further, it is known that one method of evaluating the quality of distillate products from the crude distillation unit is the measurement of ASTM D-86 temperatures corresponding to their 5 and 95 volume percent specification. The performance of a crude distillation is evaluated using the ASTM 5-95 gaps separation criteria. The details of 5 and 95 volume percent temperature for products streams and 5-95 gaps for adjacent products streams are given in Table 4.0.

TABLE 4

ASTM D-86 5 and 95 volume percent temperature and 5-95 gaps for products streams

| 95 volume % | | 5 volume % | | ASTM 5-95 Gap | |
|---|---|---|---|---|---|
| Stream | Temp. ° C. | Stream | Temp. ° C. | Stream | Temp. ° C. |
| LN_95 | 115.7 | HN-5 | 120.2 | — | — |
| HN_95 | 160.0 | Kero_5 | 148.9 | HN-LN | 4.5 |
| Kero_95 | 240.0 | LGO_5 | 223.8 | Kero-SN | −11.0 |
| LGO_95 | 320.0 | HGO_5 | 286.1 | LGO-Kero | −16.2 |
| HGO_95 | 370.0 | LR_5 | 319.4 | HGO-LGO | −33.9 |
| VD_95 | 362.0 | VD_5 | 275.5 | LR-HGO | −50.6 |
| LVGO_95 | 480.0 | LVGO_5 | 366.6 | LVGO-VD | 4.6 |
| HVGO_95 | 580.0 | HVGO_5 | 429.4 | HVGO-LVGO | −50.6 |

Pinch analysis is a proven method for estimating the minimum thermal energy of the process without designing the heat exchanger networks. In present examples, pinch analysis is used to estimate the minimum thermal energy requirement of the processes used in all examples of the present invention. The enthalpy data, supply temperature and target temperatures for hot and cold streams for carrying out the pinch analysis were collected from a converged simulation model of process flow scheme used for example-1 (FIG. 1). The delta min temperature of 20° C. was used in pinch analysis. The fuel Price of 5 $/MMBTU (Rs. 1389/Mkcal, 1$=70 rupees), operational hours of 8000, stripping steam price of Rs 1950/Tonne, furnace efficiency of 85% were used for estimating the operating cost of the process. The detail of operating energy requirement and operating cost is given in Table 5.0.

TABLE 5.0

Detail of operating energy requirement and operating cost (TPH: Tonne/hr).

| Utility | Values | Price/Annum (Crores) |
|---|---|---|
| Stripping steam (Strippers + bottom), TPH | 25.53 | 39.83 |
| Min Hot utility (ADC furnaces duty), Mkcal/h | 62.22 | 81.33 |
| VDC Furnace Duty, Mkcal/h | 35.51 | 46.41 |
| Compressor duty, kW | 0.00 | 0.00 |
| Min Cold utility, Mkcal/h | 91.55 | #Neglected |
| Total | | 167.57 |

Neglected due to the much lower price of cold utility compared to hot utility.

The gap between Reflux Temperature (RT) and Water Dew Point Temperature (WDPT) of vapour leaving the ADC's top tray can be used as indicators of the corrosive nature of the environment in the overhead systems. The positive difference will avoid the localized condensation of water in ADC's overhead system. In example-1, the values of the WDPT of vapour leaving the ADC's top tray and reflux temperatures are 111° C. and 103° C., respectively, for the specified ADC reflux drum pressure. This lead to a negative gap between RT and WDPT of vapor is −8.0° C.

Example 2: This example of the present invention illustrates the effectiveness of a new method for crude petroleum oil processing in ADC to reduce the operating cost and increase the gap between vapour's water dew point and operating temperature to alleviate the corrosion of ADC's overhead system.

The values of operating parameters such as crude flow rate, the temperature of crude oil to two-phase separating vessel (4), ADC top pressure, pressure drop across the ADC and condensers, number of trays in ADC, ADC's trays efficiency, crude entry location to ADC, pump-arounds draw and return stages, product's distillates draw stages, draw and return stages for strippers, number of trays and their efficacy in strippers, used in this example are same as used in Example 1.

The flow scheme for this example is shown in FIG. 2. The 1163.2 tonnes/hr crude containing 3.2 tonnes of dissolved water is heated to a temperature of 185° C. using Heat Exchanger Networks (HEN1 and HEN2). The heated crude, 14.5 tonnes/hr of hydrocarbon vapour (24) generated in the process from the vessel (3), and 0.1 tonnes/hr of natural gas (NG) stream (25) having 95% methane and 5% ethane are routed to a two-phase separating vessel (4) having four trays and operating at 6 kg/cm² pressure to separate the vapour and liquid fractions. The liquid from the vessel (4) is preheated to a temperature of 385° C. using the (HEN4) and fired furnace (F1). The vapour stream (7) from the vessel (4) is heated to the temperature of 350° C. The partially vaporized liquid stream (6) is routed to the flash zone (6$^{th}$ tray from bottom) of the ADC, and the superheated heated vapour stream (7A) is routed to the stripping zone (10) of ADC (8). The ADC has 58 trays and equipped with condensers and decanters.

The vapour from the flash zone is fractionated into distillates vis-à-vis unstabilized LN, HN, kerosene, LGO, and HGO. Liquid from the flash zone is stripped out using superheated hydrocarbon vapour (7B) at the bottom tray of ADC (8). The long residue (18) is obtained from the bottom of ADC (8). The HN distillate is routed to a reboiled side stripper (11), and kerosene distillate is routed to reboiled side stripper (12) to remove the dissolved lighter distillate from the product to meet the products ASTM D-86 distillation five volume percent point temperature. The LGO and HGO distillates are routed to the vessel (13A) and vessel (14A) through their respective pressure reducing valves. The vapour from the vessel (13A and 14A) are condensed and returned back to ADC with the help of pumps. The vapour stream 20 from Vessel (V2) is compressed using a compressor (CP-1) to a pressure value of 10.0 kg/cm₂ and cooled to the temperature of ° C. using a cooler (E-3) before its routing to vessel (V3). The liquid stream (22) from V3 and unstabilized light naphtha (17) from V2 are feed to the distillation column (15), having 20 trays to produce LPG and light naphtha and vapour stream (23).

The kerosene, LGO and HGO pump-arounds were used to remove the heat at different temperature level from the column. The downstream processing of long residue (18) in the VDC is the same as described in example-1. The details of pump-arounds and side strippers used in ADC and pump-arounds used in VDC to remove the heat from different trays are given in Table 6.

TABLE 6 details of pump-arounds and side strippers used

| ADC's Pump Around (PA.) | | | | |
|---|---|---|---|---|
| Pump Around | Draw tray | Return tray | Flow [tonne/h] | Temperature drop, ° C. |
| Kerosene- PA | 38 | 40 | 699.99 | 50.00 |
| LGO-PA | 24 | 26 | 370.00 | 65.00 |
| HGO-PA | 15 | 17 | 385.00 | 60.00 |
| VDC's Pump-around (PA) | | | | |
| TOP-PA | 15 | 16 | 342.0 | 57.9 |
| LVGO-PA | 9 | 10 | 461.0 | 65.5 |
| HVGO-PA | 6 | 7 | 817.0 | 54.2 |
| ADC's Strippers | | | | |
| Strippers | No of trays/ Efficiency | Liquid Draw tray | Vapour Return tray | Reboiler duty (Mkcal/hr) |
| HN reboiled Stripper | 6/0.5 | 48 | 50 | 0.32 |
| Kero reboiled Stripper | 6/0.5 | 38 | 40 | 4.12 |

The flow rates of different product produced from ADC and VDC are given in Table 7.0.

TABLE 7.0

Flow rate of products produced from ADC and VDC

| Products | Product Flow rate, TPH | Products | Product Flow rate, TPH |
|---|---|---|---|
| Non-condensate | 0.85 | VDC Top Vap | 8.55 |
| LPG | 16.00 | Vacuum Diesel (VD.) | 45.18 |
| Light Naphtha (LN) | 97.52 | Light Vacuum Gas Oil (LVGO) | 145.97 |
| Heavy Naphtha (HN.) | 22.42 | | |
| Kerosene | 187.92 | Heavy Vacuum Gas Oil (HVGO) | 155.47 |
| Light Gas Oil (LGO) | 117.10 | | |
| Heavy Gas Oil (HGO) | 68.90 | Vacuum Slop Product | 15.00 |
| Long Residue (LR) | 649.55 | Vacuum Residue (VR) | 279.30 |

The details of 5 and 95 volume percent temperature for products streams and 5-95 gaps for adjacent products streams are given in Table 8.0.

TABLE 8

5 and 95 volume percent temperature and 5-95 gaps for products streams.

| 95 volume % | | 5 volume % | | ASTM 5-95 Gap | |
|---|---|---|---|---|---|
| Stream | Temp. ° C. | Stream | Temp. ° C. | Stream | Temp. ° C. |
| LN_95 | 113.1 | HN-5 | 119.2 | — | — |
| HN_95 | 160.0 | Kero_5 | 148.9 | HN-LN | 6.1 |
| Kero_95 | 240.0 | LGO_5 | 223.1 | Kero-SN | −11.1 |
| LGO_95 | 319.9 | HGO_5 | 284.9 | LGO-Kero | −16.9 |
| HGO_95 | 369.9 | LR_5 | 308.1 | HGO-LGO | −35.0 |
| VD_95 | 360.0 | VD_5 | 271.5 | RCO-HGO | −61.9 |
| LVGO_95 | 480.0 | LVGO_5 | 367.1 | LVGO-VD | 7.1 |
| HVGO_95 | 580.0 | HVGO_5 | 443.4 | HVGO-LVGO | −36.6 |

For example, the operating energy requirement and operating cost, for example-2, is estimated using the same methodology and price values of different utilities as used in example-1. The price of 1 KWh electricity used in the example-2 is Rs. 5.0. The detail of operating energy requirement and operating cost for example-2 is given in Table 9.

TABLE 9

Detail of operating energy requirement and operating cost (TPH: Tonne/hr).

| Utility | Values | Price/Annum (Crores) |
|---|---|---|
| Stripping steam (Strippers + bottom), TPH | 0.00 | 0.00 |
| Min Hot utility (ADC furnaces duty), Mkcal/h | 62.98 | 82.32 |
| VDC Furnace Duty, Mkcal/h | 32.49 | 42.47 |
| Compressor duty, kWh | 664.97 | 2.66 |
| Min Cold utility, Mkcal/h | 66.16 | #Neglected |
| Total | | 127.45 |

Neglected due to the much lower price of cold utility compared to hot utility.

In example-2, the values of the WDPT of vapour leaving the ADC's top tray and reflux temperature are 85.2° C. and 105° C., respectively, for the specified ADC reflux drum pressure as used in example 1. This leads to a positive gap of 19.8° C. between RT and WDPT. The operating cost of the crude oil processing method shown in example-2 constructed with the accordance of the present invention is 127.45 crores.

Example 3: Example 3 (proposed case-2: PC-2) illustrates the scope for reducing ADC overhead pressure and the furnace coil outlet temperature without compromising on the quality of distillate products and still having the positive gap between vapour's water dew point and operating temperature compared to the negative gap in example-1 (base case).

The values of operating parameters in this example such as crude flow rate, the temperature of crude to two-phase separating vessel (4), pressure drop across the ADC and condensers, number of trays in ADC, ADC's trays efficiency, crude entry location to ADC, pump arounds draw and return stages, product's distillates draw stage, draw and return stages for strippers, number of trays and their efficacy in strippers are same as used in Example-2.

The flow scheme for this example is shown in FIG. 3. The 1163.2 tonnes/hr desalted crude oil containing 3.2 tonnes of water is heated to 185° C. using Heat Exchanger Networks (HEN1 and HEN2). The heated crude oil, 6.0 tonne/hr of light hydrocarbon vapour stream (24) generated in the process from the vessel (3), and 0.1 tonnes/hr of natural gas (NG) stream (25) having 95% methane and 5% ethane are routed to a two-phase separating vessel (4) having four trays and operating at 4.8 kg/cm² pressure to separate the vapour and liquid fractions. The liquid from the vessel (4) is preheated to a temperature of 369° C. using the (HEN4) and fired furnace (F1). The vapour stream (7) from the vessel (4) is heated to the temperature of 350° C. The partially vaporized liquid stream (6) is routed to the flash zone (6$^{th}$ tray from bottom) of the ADC, and the heated vapour stream (7A) is routed to the bottom tray of the stripping zone (10) of ADC (8). The ADC has 58 trays and equipped with condensers and decanters.

The vapour from the flash zone is fractionated into distillates vis-à-vis unstabilized LN, HN, kerosene, LGO, and HGO. Liquid from the flash zone is stripped out using superheated hydrocarbon vapour (7B) at the bottom tray of ADC (8). The long residue (18) is obtained from the bottom of ADC (8). The HN distillate is routed to a reboiled side stripper (11), and kerosene distillate is routed to reboiled side stripper (12) to remove the dissolved lighter fraction from the product for meeting the products ASTM D-86 distillation five volume percent point temperature. The LGO and HGO distillates are routed to the vessel (13A) and vessel (14A) through their respective pressure reducing valves. The vapour streams from the vessel (13A and 14A) are condensed and returned to ADC with the help of pumps. The vapour stream 20 from Vessel (V2) is compressed using a compressor (CP-1) to a pressure value of 10.0 kg/cm₂ and cooled to the temperature of 40° C. using a cooler (E-3) before its routing to vessel (V3). The liquid stream (22) from V3 and unstabilized light naphtha (17) from V2 are feed to the distillation column (15), having 20 trays to produce a vapour stream (23), LPG and LN.

The kerosene, LGO and HGO pump-arounds were used to remove the heat at different temperature level from the column. The downstream processing of long residue (18) in the VDC is the same as used in example-1 and example-2. The details of pump-arounds and side strippers used in ADC and pump-arounds used in VDC to remove the heat from different trays are given in Table 10.

TABLE 10 details of pump-arounds and side strippers used

| ADC's Pump Around (PA.) | | | | |
|---|---|---|---|---|
| Pump Around | Draw tray | Return tray | Flow [tonne/h] | Temperature drop, ° C. |
| Kerosene- PA | 38 | 40 | 780.00 | 50.00 |
| LGO-PA | 24 | 26 | 400.00 | 70.00 |
| HGO-PA | 15 | 17 | 300.00 | 50.00 |
| VDC's Pump-around (PA) | | | | |
| TOP-PA | 15 | 16 | 342.0 | 53.70 |
| LVGO-PA | 9 | 10 | 461.0 | 65.46 |
| HVGO-PA | 6 | 7 | 817.0 | 53.12 |
| ADC's Strippers | | | | |
| Strippers | No of trays/ Efficiency | Liquid Draw tray | Vapour Return tray | Reboiler duty (Mkcal/hr) |
| HN reboiled Stripper | 6/0.5 | 48 | 50 | 0.33 |
| Kero reboiled Stripper | 6/0.5 | 38 | 40 | 2.66 |

The flow rates of different products produced from ADC and VDC are given in Table 11.

TABLE 11

Flow rate of products produced from ADC and VDC.

| Products | Product Flow rate, TPH | Products | Product Flow rate, TPH |
|---|---|---|---|
| Non-condensate | 1.12 | VDC Top Vap | 8.48 |
| LPG | 16.01 | Vacuum Diesel (VD.) | 43.81 |
| Light Naphtha (LN) | 97.72 | Light Vacuum Gas Oil (LVGO) | 146.30 |
| Heavy Naphtha (HN. ) | 24.67 | | |
| Kerosene | 187.81 | Heavy Vacuum Gas Oil (HVGO) | 154.86 |
| Light Gas Oil (LGO) | 119.91 | | |
| Heavy Gas Oil (HGO) | 65.36 | Vacuum Slop Product | 15.00 |
| Long Residue (LR) | 647.76 | Vacuum Residue (VR) | 279.20 |

The details of 5 and 95 volume percent temperature for products streams and 5-95 gaps for adjacent products streams are given in Table 12.

TABLE 12

5 and 95 volume percent temperature and 5-95 gaps for products streams.

| | 95 volume % | | 5 volume % | | ASTM 5-95 Gap |
|---|---|---|---|---|---|
| Stream | Temp. °C. | Stream | Temp. °C. | Stream | Temp. °C. |
| LN_95 | 112.70 | HN-5 | 120.52 | — | — |
| HN_95 | 160.00 | Kero_5 | 149.13 | HN-LN | 7.8 |
| Kero_95 | 240.00 | LGO_5 | 222.40 | Kero-SN | −10.1 |
| LGO_95 | 320.00 | HGO_5 | 284.10 | LGO-Kero | −17.6 |
| HGO_95 | 370.10 | LR_5 | 313.03 | HGO-LGO | −36.0 |
| VD_95 | 360.00 | VD_5 | 282.44 | RCO-HGO | −57.1 |
| LVGO_95 | 480.00 | LVGO_5 | 367.43 | LVGO-VD | 7.4 |
| HVGO_95 | 580.00 | HVGO_5 | 429.58 | HVGO-LVGO | −50.4 |

The operating energy requirement and operating cost in example-3 is estimated using the same methodology and price values of different utilities as used in example-1 and 2. The detail of operating energy requirement and operating cost for example-3 is given in Table 13.

TABLE 13

Detail of operating energy requirement and operating cost (TPH: Tonne/hr).

| Utility | Values | Price/Annum (Crores) |
|---|---|---|
| Stripping steam (Strippers + bottom), TPH | 0.00 | 0.00 |
| Min Hot utility (ADC furnaces duty), Mkcal/h | 51.61 | 67.47 |
| VDC Furnace Duty, Mkcal/h | 38.85 | 50.78 |
| Compressor duty, kWh | 860.92 | 3.43 |
| Min Cold utility, Mkcal/h | 55.16 | #Neglected |
| Total | | 121.70 |

Neglected due to the much lower price of cold utility compared to hot utility.

The values of WDPT of ADC's top vapour and reflux temperature are 79.5° C. and 92.1° C., respectively, even for the reduced ADC reflux drum pressure compared to example 1. This lead to the positive gap of 12.7° C. between RT and WDPT.

The operating cost of the crude oil processing method shown in example-3 constructed with the accordance of the prior art is 121.70 crores.

Example 4: Example 4 (proposed case-3: PC-3) illustrates the scope for reducing vapor stream (20) compression capital and energy cost compared to example 2. The flow scheme for this example is shown in FIG. 5. The values of operating parameters in this example such as crude flow rate, the temperature of crude to two-phase separating vessel (4), pressure drop across the ADC and condensers, number of trays in ADC, ADC's trays efficiency, crude entry location to ADC, pump arounds draw and return stages, product's distillates draw stage, return stages for condensed vapor liquids and strippers vapor, number of trays and their efficacy in strippers, long residue processing in VDC are same as used in Example-2. The operation of crude processing is also same as used in example 2 except that the vapour stream (20) from vessel (V2) is compressed in the pressure range of 6-12 kg/cm² using the compressor (CP-1). The compressed vapor is cooled in cooler (E-3) in the temperature range of 35-50° C. The cooled stream (20A) is routed to bottom tray of absorption tower (ABS) having plural trays. One part (stream, 17A) of unstabilized naphtha stream (17) is routed to top tray of ABS. The liquid stream (22) from ABS and remaining part (stream, 17B) of unstabilized naphtha stream (17) are routed to the distillation column (15) to produce the LPG and Light Naphtha LN product and noncondensate vapour stream (23).

The details of pump-arounds and side strippers used in ADC and pump-arounds used in VDC to remove the heat from different trays are given in Table 14.

TABLE 14 details of pump-arounds and side strippers used

| ADC's Pump Around (PA.) | | | | |
|---|---|---|---|---|
| Pump Around | Draw tray | Return tray | Flow [tonne/h] | Temperature drop, ° C. |
| Kerosene- PA | 38 | 40 | 699.99 | 50.00 |
| LGO-PA | 24 | 26 | 370.00 | 65.00 |
| HGO-PA | 15 | 17 | 385.00 | 60.00 |
| VDC's Pump-around (PA) | | | | |
| TOP-PA | 15 | 16 | 342.0 | 57.9 |
| LVGO-PA | 9 | 10 | 461.0 | 65.5 |
| HVGO-PA | 6 | 7 | 817.0 | 54.2 |
| ADC's Strippers | | | | |
| Strippers | No of trays/ Efficiency | Liquid Draw tray | Vapour Return tray | Reboiler duty (Mkcal/hr) |
| HN reboiled Stripper | 6/0.5 | 48 | 50 | 0.54 |
| Kero reboiled Stripper | 6/0.5 | 38 | 40 | 4.94 |

The flow rates of different product produced from ADC and VDC are given in Table 7.0.

TABLE 15.0

Flow rate of products produced from ADC and VDC

| Products | Product Flow rate, TPH | Products | Product Flow rate, TPH |
|---|---|---|---|
| Non-condensate | 0.68 | VDC Top Vap | 8.49 |
| LPG | 16.00 | Vacuum Diesel (VD.) | 43.63 |
| Light Naphtha (LN) | 96.18 | Light Vacuum Gas Oil (LVGO) | 146.16 |
| Heavy Naphtha (HN.) | 28.58 | | 155.46 |
| Kerosene | 183.00 | Heavy Vacuum Gas Oil (HVGO) | 15.00 |
| Light Gas Oil (LGO) | 118.28 | | |
| Heavy Gas Oil (HGO) | 69.41 | Vacuum Slop Product | 8.49 |
| Long Residue (LR) | 648.17 | Vacuum Residue (VR) | 43.63 |

The details of 5 and 95 volume percent temperature for products streams and 5-95 gaps for adjacent products streams are given in Table 16.0.

TABLE 16

5 and 95 volume percent temperature and 5-95 gaps for products streams.

| | 95 volume % | | 5 volume % | | ASTM 5-95 Gap |
|---|---|---|---|---|---|
| Stream | Temp. °C. | Stream | Temp. °C. | Stream | Temp. °C. |
| LN_95 | 123.5 | HN-5 | 119.8 | — | — |
| HN_95 | 160.0 | Kero_5 | 152.4 | HN-LN | −3.7 |
| Kero_95 | 240.0 | LGO_5 | 223.5 | Kero-SN | −9.1 |
| LGO_95 | 319.9 | HGO_5 | 285.1 | LGO-Kero | −16.5 |
| HGO_95 | 369.9 | LR_5 | 309.60 | HGO-LGO | −34.8 |
| VD_95 | 197.7 | VD_5 | 272.0 | RCO-HGO | −60.3 |

TABLE 16-continued 5 and 95 volume percent temperature and 5-95 gaps for products streams.

| | 95 volume % | | 5 volume % | | ASTM 5-95 Gap |
| --- | --- | --- | --- | --- | --- |
| Stream | Temp. °C. | Stream | Temp. °C. | Stream | Temp. °C. |
| LVGO_95 | 360.0 | LVGO_5 | 366.9 | LVGO-VD | 6.9 |
| HVGO_95 | 480.0 | HVGO_5 | 443.2 | HVGO-LVGO | −36.8 |

The operating energy requirement and operating cost, for example-3 is estimated using the same methodology and price values of different utilities as used in example-2. The detail of operating energy requirement and operating cost for example-3 is given in Table 17.

TABLE 17

Detail of operating energy requirement and operating cost (TPH: Tonne/hr).

| Utility | Values | Price/Annum (Crores) |
| --- | --- | --- |
| Stripping steam (Strippers + bottom), TPH | 0.00 | 0.00 |
| Min Hot utility (ADC furnaces duty), Mkcal/h | 62.95 | 82.99 |
| VDC Furnace Duty, Mkcal/h | 32.52 | 42.51 |
| Compressor duty, kWh | 482.23 | 1.93 |
| Min Cold utility, Mkcal/h | 66.00 | #Neglected |
| Total | | 126.73 |

Neglected due to the much lower price of cold utility compared to hot utility.

In example-4, the values of the WDPT of vapour leaving the ADC's top tray and reflux temperature are 84.1° C. and 102.8° C., respectively, for the specified ADC reflux drum pressure as used in example 2. This leads to a positive gap of 18.7° C. between RT and WDPT. The operating cost of the crude oil processing method proposed in example-2 constructed with the accordance of the present invention is 126.73 crores.

Comparative results of example-1, example-2, example 3 and 4 indicate following observations:
I. The values of the ASTM D-86 5 volume %, 95 volume % temperatures, ASTM D-86: 5-95 gap of distillate products, the flow rate of residue (Vacuum residue+ Slop) are similar to example-1 (base case). This ensures that quality and total quantity of distillate products were not compromised in the present invention to reduce operating cost and the positive temperature gap between reflux temperature and vapour's water dew point to alleviate the corrosion in the overhead system ADC.
II. The gap between reflux temperature and water dew point of vapour is −8.0 C for example-1, 19.8 for example-2, 12.7° C. for example-3 and 18.7° C. for example-4. This implies that a negative gap in example based on prior art processing scheme can lead to localized water condensation in the overhead system, which can dissolve HCl, NH$_3$ and amines; as a result, the chances of acid and salt deposition assisted corrosion in the overhead system of ADC can occur. Whereas, significant positive gap between reflux temperature and water dew point of vapour avoid the possibility of localised water condensation in present inventions schemes used in examples 2, 3 and 4.
III. There is a scope of reduction in operating cost by 23.9% for the present invention's crude petroleum oil processing scheme compared to the prior art based scheme for example 2, 27.4% for example 3 and 24.4 for example 4.
IV. Moreover, the coil outlet temperature in example-3 is reduced to 369° C. from 385° C. used in example-1 (BC) and example-2 (PC-1). This indicates that the implementation of this crude oil processing method of the present invention can help in reducing the Coil Outlet Temperature (COT) by 16° C. without compromising on the distillates yields, their quality. Lower COT will reduce the crude cracking tendency in the furnace and bottom section of ADC.
V. The present invention also helps in reducing the ADC's pressure and still having the significant positive gap between reflux temperature and vapour water dew point, i.e. without increasing the intensity of corrosive environment in the overhead system of ADC.

It can be noted that operating conditions (temperature, pressure, flow rate etc.) used in these studied examples were just a way of illustrating the present invention and, however, the invention is not limited to these operating conditions.

ADVANTAGES OF INVENTION

The utilization of the present invention has several distinct advantages over prior art crude oil processing methods.
Energy savings by 12-18%, reduction in operating cost by 23-26% for crude processing compared to existing methods (base case).
Increased temperature gap between vapour's water dew point and reflux temperature compared to existing methods (base case). The increased gap will avoid the chances of localized water condensation and help in alleviating the corrosive environment severity in the top section and overhead system of ADC (example 1 constructed with accordance to prior art: Negative (−8° C.), example 2 constructed with accordance to present invention: Positive (19.8° C.).
Provides the flexibility to reduce ADC's operating pressure and still has a significant positive temperature gap between vapour's water dew point and reflux temperature. This leads to a significant reduction in the furnace Coil Outlet Temperature (COT), which helps in reducing the cracking tendency of crude oil in the furnace and ADC bottom section without compromising on ADC's distillate yield and products quality.
Significant reduction in size and load of ADC's condenser due to stripping steam elimination from the ADC operation.
Energy savings will also decrease GHG emissions from the crude unit to the environment and make the crude oil processing cleaner and greener.

We claim:
1. A method for crude petroleum oil processing in a crude distillation unit comprising:
a) subjecting crude petroleum oil (1) to a desalter (2) along with water in a temperature range of 110-140° C. to remove water-soluble salts, thereby creating a desalted crude oil;
b) heating the desalted crude oil in a Heat Exchanger Network (HEN2) and routing partially vaporized crude oil (3), hydrogen vapor (24), and a natural gas stream (25) to a two-phase separating vessel (4);
c) superheating hydrocarbon vapour (7) from the two-phase-separating vessel (4) to form superheated hydrocarbon vapour (7B) using hot process steam and external heating sources;

d) heating a liquid crude oil stream (5) obtained from the two-phase separating vessel (4) in the Heat Exchanger Network (HEN3) in a temperature range of 270-330° C. and feeding to a fired furnace (F1) for its heating in a temperature range of 360-390° C.;

e) injecting superheated hydrocarbon vapour (7B) to a stripping section (10) and routing of the partially vaporized crude oil (6) from a furnace (F1) to flash zone (9) of atmospheric distillation column (8) having a plurality of trays to generate different distillates, overhead vapour (15) and long residue stream (18);

f) cooling overhead vapour (15) using condenser (E-1) and feeding to vessel (V1) to separate vapour (16) and liquid (reflux) which is routed to atmospheric distillation column (8);

g) routing the vapour (16) and water stream (16A) to cooler (E-2) for cooling in a temperature range of 35-50° C. and feeding stream (16B) to vessel (V2) to separate unstabilized naphtha (17) and vapour stream (20);

h) compressing the vapour stream (20) using compressor (CP-1) and cooling the compressed vapour in the temperature range of 35-50° C. using cooler (E-3) to generate cold stream (20A);

i) subjecting the cooled stream (20A) to vessel (V3) to separate liquid as stream (22) and noncondensed vapour as stream (21);

j) subjecting the unstabilized naphtha (17) from step (g) and liquid stream (22) from step (i) to distillation column (15) to produce an LPG product, a Light Naphtha (LN) product and vapour stream (23);

k) mixing the vapour stream (21) from step (i) and the vapour stream (23) from step (j) to form the stream (24), which is subjected to the two-phase separating vessel (4) in step (b) after withdrawing a purge stream from the stream (24);

l) passing heavy naphtha and kerosene distillates from a different tray of the distillation column (8) to side strippers (11 and 12) respectively to remove lighter hydrocarbon and to obtain heavy naphtha (HN) and kerosene products;

m) routing Light and Heavy Gas Oil (LGO and HGO) distillates obtained from the different tray of the distillation column (8) to vessel (13A) and vessel (14A) respectively through their respective pressure-reducing valves or routing the LGO and HGO distillates to heaters E-6 and E-7 respectively prior to their routing to vessel (13A) and vessel (14A) or routing the LGO and HGO distillates to respective reboiled strippers (13B) and reboiled strippers (14B) to remove dissolved lighter hydrocarbon to meet LGO and HGO product ASTM D-86 vol % temperature specification;

n) condensing vapour (26) from the vessel (13A) and vapour (27) from the vessel (14A) using coolers (E6) and (E8) respectively and routing of respective condensate to the atmospheric distillation column (8) using pumps; and o) heating the long residue stream (18) along with coil steam in furnace (F3) and processing partially vaporized crude (19) in a Vacuum Distillation Column (VDC).

2. The method as claimed in claim 1, wherein the desalted crude oil from step (b) is heated in Heat Exchanger Network (HEN2) in a temperature range of 160-250° C.

3. The method as claimed in claim 1, wherein the desalted crude oil from step (b) is heated in Heat Exchanger Network (HEN2) in a temperature range of 170-250° C.

4. The method as claimed in claim 1, wherein the hydrocarbon vapour (7) from step (c) is superheated in a temperature range of 300-380° C. using Heat Exchanger Network HEN4 or high-pressure steam heater (HPX) or furnace (F2) or separate vapour heating coils along with crude oil coils in the furnace (F1) or their combination.

5. The method as claimed in claim 1, wherein the cooled stream (20A) generated in step (h) is routed to bottom tray of absorption tower (ABS) having plural trays,
   wherein one portion (17A) of unstabilized naphtha stream (17) is routed to top tray of ABS,
   wherein the liquid stream (22) from ABS and second part (17B) of unstabilized naphtha stream (17) are routed to the distillation column (15) to produce the LPG, a Light Naphtha (LN) product and noncondensate vapour stream (23).

6. The method as claimed in claim 1,
   wherein steam (30) is injected at a bottom of ADC (8) having a mass ratio between the steam (30) to superheated hydrocarbon vapour (7B) in a range of 0.01-0.2.

7. The method as claimed in claim 1, wherein the overhead vapour (15) from step (f) is cooled using the condenser (E-1) in a temperature range of 70-130° C.

8. The method as claimed in claim 1, wherein the vapour stream (20) from step (h) is compressed using compressor (CP-1) in a pressure range of 5-15 kg/cm².

9. The method as claimed in claim 1, wherein light gas oil (LGO) distillate and Heavy Gas Oil (HGO) distillate obtained from ADC (8) are heated in heat exchangers E-6 and E-7, respectively, using either hot products and pump-around streams or liquid stream (28) collected from an adjacent upper tray to flash zone (9) of ADC (8) or a stream (29) drawn from long residue (18) prior to routing to vessel (13A) and vessel (14A), respectively.

10. The method as claimed in claim 1, wherein liquid stream (28) collected from an adjacent upper tray to flash zone (9) of ADC (8) or a stream (29) drawn from the long residue (18) is used as hot process stream for HGO stripper's reboiler (E-8) to meet a temperature requirement in a reboiler.

11. The method as claimed in claim 1, wherein liquid stream (28) collected from an adjacent upper tray to flash zone (9) of ADC (8) or a stream (29) withdrawn from long residue stream (18) or other hot stream is used in LGO stripper reboiler.

12. The method as claimed in claim 1, wherein the hydrocarbon vapour stream (20) is heated in a temperature range of 100-200° C. using process hot stream prior to feeding to vessel (3).

13. The method as claimed in claim 1, wherein the hydrocarbon vapour (7) from step (c) is superheated in a temperature range of 330-370° C. using Heat Exchanger Network HEN4 or high-pressure steam heater (HPX) or furnace (F2) or separate vapour heating coils along with crude oil coils in the furnace (F1) or their combination.

14. The method as claimed in claim 1, wherein the overhead vapour (15) from step (f) is cooled using the condenser (E-1) in a temperature range of 80-120° C.

15. The method as claimed in claim 1, wherein the vapour stream (20) from step (h) is compressed using compressor (CP-1) in a pressure range of 6-12 kg/cm².

\* \* \* \* \*